(12) United States Patent
Larson et al.

(10) Patent No.: US 12,314,802 B2
(45) Date of Patent: May 27, 2025

(54) ASSET TRACKING

(71) Applicant: AIRGAIN, Inc., San Diego, CA (US)

(72) Inventors: Kurt Larson, Plymouth, MN (US);
John Young, Plymouth, MN (US);
Ganesh Sivaraman, Reading, MA (US)

(73) Assignee: Airgain, Inc., San Diego, CA (US)

( * ) Notice: Subject to any disclaimer, the term of this patent is extended or adjusted under 35 U.S.C. 154(b) by 49 days.

(21) Appl. No.: 18/090,930

(22) Filed: Dec. 29, 2022

(65) Prior Publication Data

US 2023/0214608 A1    Jul. 6, 2023

Related U.S. Application Data

(60) Provisional application No. 63/295,115, filed on Dec. 30, 2021.

(51) Int. Cl.
*G06K 7/10* (2006.01)

(52) U.S. Cl.
CPC ................. *G06K 7/10356* (2013.01)

(58) Field of Classification Search
None
See application file for complete search history.

(56) References Cited

U.S. PATENT DOCUMENTS

| | | | |
|---|---|---|---|
| 9,860,718 B2* | 1/2018 | Kumar | .............. H04L 63/123 |
| 10,068,116 B2 | 9/2018 | Good | |
| 2016/0260301 A1 | 9/2016 | Miller | |
| 2017/0213173 A1* | 7/2017 | Dong | ............. G06Q 10/06315 |
| 2022/0375582 A1* | 11/2022 | Hohberger | ........... A61B 5/1126 |

OTHER PUBLICATIONS

International Patent Application No. PCT/US2022/054253, filed Dec. 29, 2022; International Search Report / Written Opinion issued Apr. 24, 2023; 13 pages.

\* cited by examiner

*Primary Examiner* — Carlos Garcia
(74) *Attorney, Agent, or Firm* — Mueting Raasch Group

(57) ABSTRACT

Systems, asset tag devices, and methods are described herein to provide asset, or object, tracking using a plurality of beacons. The asset tag devices may be affixed, or coupled to, the asset, or object, and may receive beacon advertising packets from the beacons, and then transmit, or broadcast, tag advertising packets including information from the received beacon advertising packets, which may be used to determine an approximate location of the asset tag device, and in turn, the asset or object.

14 Claims, 9 Drawing Sheets

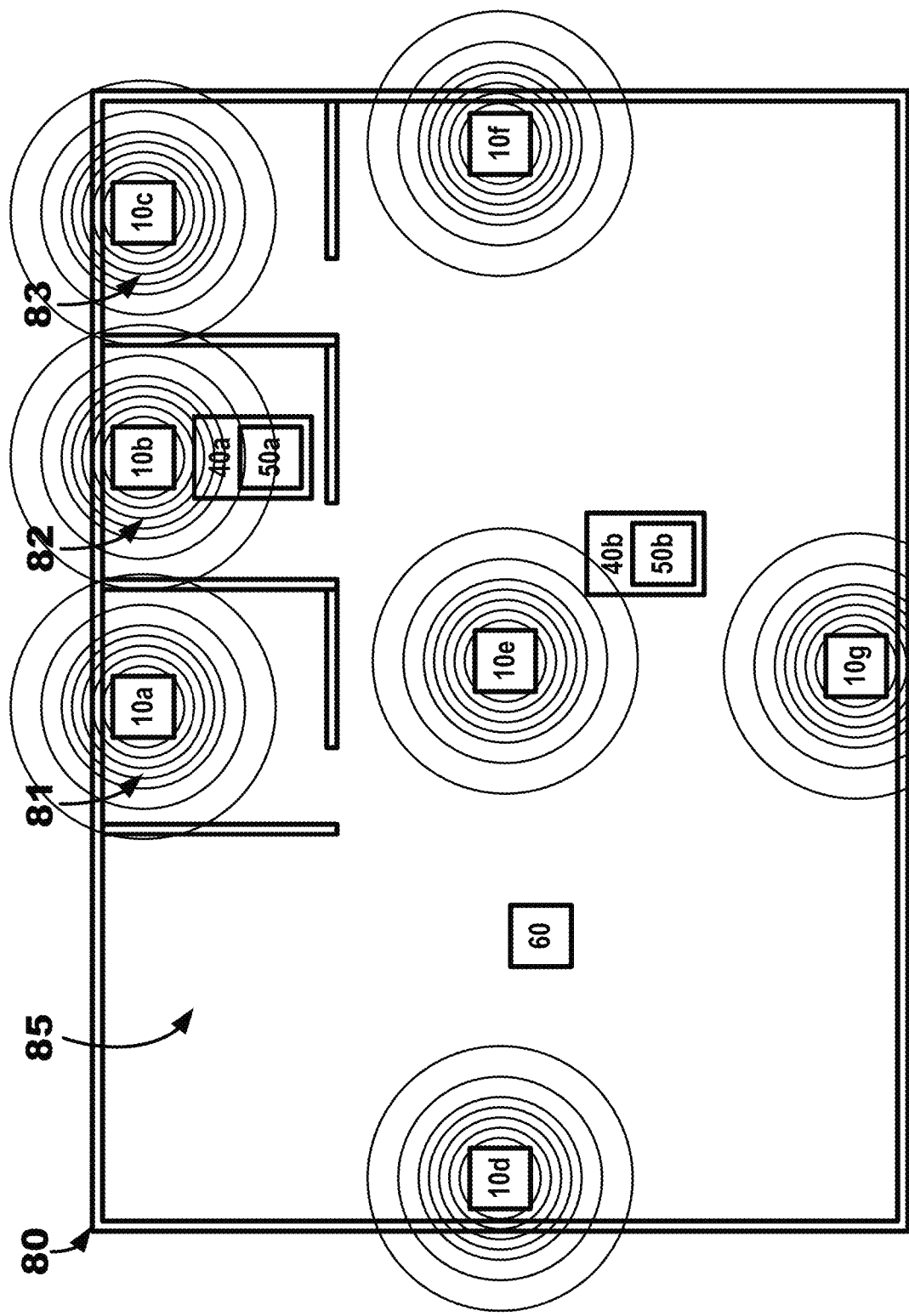

ASSET TRACKING

This application claims the benefit of U.S. Provisional Application No. 63/295,115 filed Dec. 30, 2021, and entitled "Asset Tracking," which is incorporated by reference in its entirety. The disclosure herein relates to systems, devices, and methods of use in asset tracking.

Asset tracking devices designed to track assets, or objects, find use in manufacturing, warehousing, retail inventory management, and medicine, to name a few areas. Asset tracking devices may typically have the highest location accuracy outdoors using infrastructure like global positioning systems (GPS). Users, however, may also want to track assets indoors but the same asset tracking devices used outdoors may not work indoors (e.g., GPS may not work indoors). Being able to identify and track assets as they move throughout buildings or other indoor areas with high precision is important for a wide variety of applications. Previous indoor asset tracking solutions may utilize WiFi and cellular triangulation methods for location approximation, but the resolution is often poor and may rely on a database of cell towers and WiFi access points to calculate a location estimate. Further, previous asset tracking devices may utilize ultrawideband signaling, which may have high power consumption resulting in a reduce battery life and may require a plurality of beacons to compute triangulation. Still further, previous asset tracking devices may utilize various protocols, such as BLUETOOTH 5.1, that include angle-of-arrival and angle-of-departure technologies; however, such technologies may require a high quantity of beacons throughout physical location to achieve a desired resolution and a large infrastructure investment. Further, beacons in such systems must be connected to network to communicate with each other or compute resource, triangulation must be computed by dedicated resource onsite, and ultimately the asset tracking device does not determine its location (instead, a central server will know the location of the asset tracking device based on communications with the networked resources).

The systems, devices, and methods may improve indoor asset tracking by increasing location resolution and decreasing cost and complexity over previous systems, devices, and methods as will be described further herein.

SUMMARY

Illustrative systems, devices, and methods may be described as operating through the use of a plurality of beacons positioned, or located, about a physical space. An asset tag device, or asset tag, may scan for beacons and receive beacon advertising packets from one or more of the plurality of beacons, and then transmit, or re-broadcast, those beacon advertising packets or information related thereto or therein in a tag advertising packet (e.g., as part of the payload), which may be received by a gateway and then transmitted to a server. One or more of the asset tag device, gateway, and server may use the beacon advertising packets and/or information with respect thereto (e.g., signal strength and/or number of observations over an observation period) to determine the beacon that is physically closest to the asset tag device. Further, one or more of the asset tag device, gateway, and server may include, or have, location information for each of the plurality of beacons, and thus, upon determining the beacon that is physically closest to the asset tag device, may determine the approximate location of the asset tag device. Additionally, in one or more embodiments, each beacon advertising packet may include location information of the associated beacon in the payload thereof, which may then be used by one or more of the asset tag device, gateway, and server to determine the approximate location of the asset tag device.

One illustrative system disclosed herein may include a plurality of beacons positioned about a physical space. Each beacon may include an antenna to transmit beacon advertising packets, and each beacon advertising packet may include a beacon identifier. The system may further include an asset tag device attached to an asset and including an antenna to receive beacon advertising packets and to transmit tag advertising packets. Each tag advertising packet may include a tag identifier and one or more beacon identifiers of the received beacon advertising packets. The system may further include a gateway including an antenna to receive tag advertising packets.

One illustrative asset tag device disclosed herein may include an antenna to receive beacon advertising packets and to transmit tag advertising packets. The device may further include a processing apparatus including one or more processors and operably coupled to the antenna. The processing apparatus may be configured to receive beacon advertising packets from a plurality of beacons positioned about a physical space. Each beacon advertising packet may include a beacon identifier. The processing apparatus may be further configured to transmit tag advertising packets. Each tag advertising packet may include a tag identifier and one or more beacon identifiers of the received beacon advertising packets.

One illustrative method disclosed herein may include receiving beacon advertising packets from a plurality of beacons positioned about a physical space. Each beacon advertising packet may include a beacon identifier. The method may further include transmitting tag advertising packets. Each tag advertising packet may include a tag identifier and one or more beacon identifiers of the received beacon advertising packets.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIGS. 6A-6D are diagrammatic overhead views of an illustrative system performing asset tracking according to the methods and processes described herein.

DETAILED DESCRIPTION OF ILLUSTRATIVE EMBODIMENTS

Figure 1:
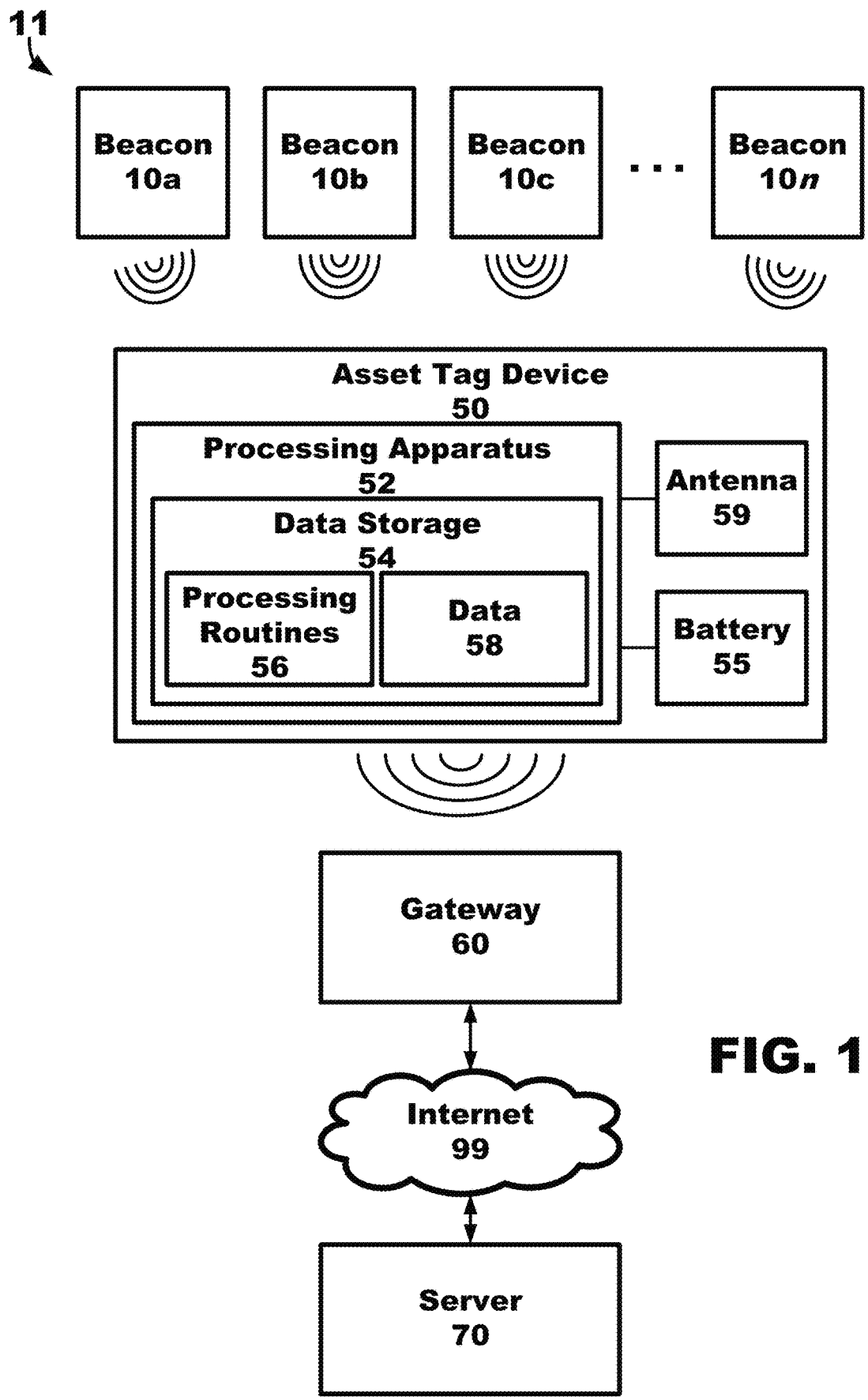
FIG. 1 is block diagram of an illustrative asset tracking system.

In the following detailed description of illustrative embodiments, reference is made to the accompanying figures of the drawing which form a part hereof, and in which are shown, by way of illustration, specific embodiments which may be practiced. It is to be understood that other embodiments may be utilized, and structural changes may be made without departing from (e.g., still falling within) the scope of the disclosure presented hereby.

Illustrative systems, asset tag devices, and methods shall be described with reference to FIGS. 1-6. It will be apparent to one skilled in the art that elements or processes from one embodiment may be used in combination with elements or processes of the other embodiments, and that the possible embodiments of such systems, devices, and methods using combinations of features set forth herein is not limited to the specific embodiments shown in the figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings or types of elements may be advantageous over others.

An illustrative asset tracking system 11 is depicted in FIG. 1. The asset tracking system 11 may include, among other things, a plurality of beacons 10a-10n, an asset tag device 50, a gateway 60, and a server 70. Although, in this example, a plurality of beacons 10a-10n are depicted but only a single asset tag device 50, a single gateway 60, and a single server 70 are depicted, it is to be understood that the illustrative system 11 may include more than one asset tag device 50 (e.g., a plurality of asset tag devices 50), more than one gateway 60 (e.g., a plurality of gateways 60), and more the one server 70 (e.g., a plurality of servers 70).

The asset tag device 50 may be affixed (e.g., adhered to, mounted to, and/or coupled to) to an asset, or object, such that the asset tag device 50 moves with the asset or object. In this way, the physical location of the asset tag device 50 will be the same as the physical location as the asset. The asset tag device 50 may be affixed to the asset in various different ways. For example, the asset tag device 50 may be adhered to the asset using, among other things, glue, tape, hook-and-loop fasteners. Further, various fasteners, such as, for example, screws, may be used to affix the asset tag device 50 to the asset. Each of the beacons 10 may be affixed to static objects located or positioned within a physical space, such as, for example, walls, ceilings, beams, posts, and/or other spaces or objects to facilitate the tracking of the asset tag device 50 within or relative to the physical space as will be described further herein. Similar to the asset tag device 50, the beacons 10 may be affixed (e.g., adhered to, mounted to, and/or coupled to) to the static objects in various different ways. For example, the beacons 10 may be adhered to the static objects using glue, tape, hook-and-loop fasteners, and/or any other suitable fastening apparatus. Further, for example, various fasteners, such as, for example, screws, may be used to affix the beacons 10 to the static objects. As described further herein, in one or more embodiments, the beacons 10 may be distributed about a physical space such as, for example, in a uniform, relatively equidistant fashion, so as to provide tracking of the asset tag device 50.

The asset tag device 50 may include, among other things, a processing apparatus 52, an antenna 59, and a battery 55. The processing apparatus 52 may generally include any hardware and software so as to be able to perform or execute the illustrative methods and processes described herein. The processing apparatus 52 may be operably coupled to the antenna 59 to receive and transmit, among other things, beacon advertising packets and tag advertising packets and operably coupled to the battery 55 to receive electricity to the power the processing apparatus 52 and the antenna 59. Generally, the processing apparatus 52 may be configured to perform or execute a variety of methods and processes including one or more of receiving beacon advertising packets, determining a closest beacon, evaluating signal strength of a plurality of beacon advertising packets, processing location information, generation or formation of tag advertising packets, and transmitting tag advertising packets using the antenna 59, which will be described in more detail herein. More generally, the processing apparatus 52 may be described as providing functionality to enable location determination of the asset tag device 50 itself using the systems and methods described herein.

Further, the processing apparatus 52 includes data storage 54. The data storage 54 allows for access to processing programs or routines 56 and one or more other types of data 58 that may be employed to carry out the illustrative tracking methods and processes described herein. For example, processing programs or routines 56 may include programs or routines for performing signal processing algorithms, data processing algorithms, data packet generation algorithms, data packet processing algorithms, database lookup, comparison algorithms, computational mathematics, matrix mathematics, compression algorithms (e.g., data compression algorithms), vector mathematics, or any other processing required to implement one or more embodiments as described herein.

The data 58 may include, for example, received beacon advertising packets received or sampled using the antenna 59, tag advertising packets for transmission or broadcast using the antenna 59, beacon location information from beacon advertising packets or in a database or lookup table, beacon signal strength information, beacon observation information (e.g., a number of observations of each beacon of over an observation time period), results from one or more processing programs or routines employed according to the disclosure herein, or any other data that may be necessary for carrying out the one or more processes or methods described herein.

In one or more embodiments, the asset tag device 50 including the processing apparatus 52 may be implemented using one or more computer programs executed on programmable computers, such as computers that include, for example, processing capabilities (e.g., microcontrollers and/or programmable logic devices), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The programs used to implement the processes described herein may be provided using any programmable language, for example, a high-level procedural and/or object orientated programming language that is suitable for communicating with a computer system. Any such programs may, for example, be stored on any suitable device, for example, a storage media, readable by a general or special purpose program, computer or a processor apparatus for configuring and operating the computer when the suitable device is read for performing the procedures described herein. In other words, at least in one embodiment, the asset tag device 50 including the processing apparatus 52 may be implemented using a computer readable storage medium, configured with a computer program, where the storage medium so configured causes the computer to operate in a specific and predefined manner to perform functions described herein. The exact configuration of the processing apparatus 52 is not limiting and essentially any device capable of providing suitable computing capabilities and control capabilities (e.g., receiving beacon advertising packets, analyzing data in the received beacon advertising packets, and/or transmitting tag advertising packets) may be used.

Further, in one or more embodiments, the output such as, for example, tag advertising packets may be analyzed by a user and/or used by another machine that provides output based thereon. As described herein, a digital file may be any medium (e.g., volatile or non-volatile memory, a memory card, a magnetic storage medium such as a hard disk, a CD-ROM, a punch card, and/or magnetic recordable tape) containing digital bits (e.g., encoded in binary, and/or trinary) that may be readable and/or writeable by processing apparatus 52 described herein. Also, as described herein, a file in user-readable format may be any representation of data (e.g., ASCII text, binary numbers, hexadecimal numbers, decimal numbers, audio, and/or graphical) presentable on any medium (e.g., paper, a display, and/or sound waves) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware which is to be used to implement the processes described herein shall not be limiting on the scope of the systems, processes or programs (e.g., the functionality provided by such systems, processes, and/or programs) described herein.

The methods described in this disclosure, including those attributed to the systems, asset tag device, or various constituent components, may be implemented, at least in part, in hardware, software, firmware, or any combination thereof. For example, various aspects of the techniques may be implemented within one or more processors, including one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described components may be implemented together or separately as discrete but interoperable logic devices. Depiction of different features, for example, using block diagrams, is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by one or more processors to support one or more aspects of the functionality described in this disclosure.

The antenna 59 of the asset tracking device 50 may configured to transmit and receive radiofrequency (RF) signals to perform the functionality and processes described herein. In particular, the antenna 59, in conjunction with the processing apparatus 52, is configured to transmit and receive advertising packets using BLUETOOTH LOW ENERGY (BLE) operating at 2.4 GHz. Further, the antenna 59 may broadcast a BLE signal up to approximately 500 meters.

More specifically, the asset tag device 50, using the antenna 59, may be configured to transmit tag advertising packets and receive beacon advertising packets. The tag advertising packets may be transmitted periodically from the asset tag device 50. For example, a tag advertising packet may be transmitted about every 1 second to about every 60 seconds. In other words, the tag advertising packet broadcasting time period may be between about 1 second to about 1 minute. In at least one embodiment, the time period between transmitting of tag advertising packets, or the tag advertising packet broadcasting time period, may be 10 seconds. In at least one embodiment, the time period between transmitting of tag advertising packets, or the tag advertising packet broadcasting time period, may be greater than or equal to 2 seconds, greater than or equal to 5 seconds, greater than or equal to 10 seconds, greater than or equal to 15 seconds, or greater than or equal to 20 seconds, and/or less than or equal to 50 seconds, less than or equal to 40 seconds, or less than or equal to 30 seconds. Additionally, it is to be understood that the asset tag device 50 may be programmed, or configured, at the time of manufacture and/or prior to use to utilize a selected tag advertising broadcasting time period based on various factors. Also, the asset tag device 50 can also be reconfigured dynamically during runtime. For example, scanning frequency (i.e., the time period between scanning for beacon advertising packets) and advertising frequency (i.e., the time period between transmitting tag advertising packets) may change based on date and/or time, according to a schedule, or based on other dynamic factors detectable by the device or transmitted to the device from beacons 10 or gateways 60. For instance, asset tag devices 50 coupled to frequently moved assets may utilize a higher scanning and advertising frequency that asset tag devices coupled to assets that remain static for significant periods of time. More specifically, in one or more embodiments, the asset tag device 50 may further include a motion or movement sensor such as, for example, an accelerometer, configured to sense movement of the asset tag device 50, and when the asset tag device 50 senses an increase in movement (for example, more movement over time), the scanning and advertising frequency may also increase. Conversely, when the asset tag device 50 senses a decrease in movement (for example, less movement over time), the scanning and advertising frequency may decrease.

Each tag advertising packet may include a tag identifier that is a unique identifier that allows other devices and systems to identify the asset tag device 50 and correlate such identity to other information about the asset tag device 50 such as, for example, the asset that the asset tag device 50 may be affixed to. Additionally, each tag advertising packet may include information that may assist the asset tag device 50 and other systems and devices to determine the approximate location of the asset tag device 50. In particular, for example, the tag advertising packets may include one or more beacon identifiers of received beacon advertising packets, which are similar to the tag advertising packets but transmitted, or broadcast, by the beacons 10 as will be described further herein. In one or more embodiments, each of the tag advertising packets may include a payload portion, and the payload portion may include information that may be used to determine the location thereof. The information may include, for example, one or more beacon identifiers of received beacon advertising packets, a signal strength value for each of the received beacon advertising packets corresponding to and representative of a signal strength of the received beacon advertising packet, a number of observations for each of the received beacon advertising packets that each received beacon advertising packet has been observed over an observation period, and/or any other metrics that may be used to determine the beacon 10 that is closest to an asset tag device 50. In one or more embodiments, the payload portion of each of the tag advertising packets may include the beacon identifier of the closest beacon 10 (which may be determined by the asset tag device 50 based on signal strength, number of observations, and/or any other metrics that may be used to determine the beacon 10 that is closest to an asset tag device 50) or the beacon 10 having the strongest signal. Additionally, it is to be understood that, in some embodiments, the payload portion of each of the tag advertising packets may include more than one beacon identifier such as a plurality of beacon identifiers. For instance, the asset tag device 50 may receive more than one unique beacon advertising packet, and thus, may include the beacon identifiers of each received unique beacon advertising packet in the tag advertising packet. In at least one embodiment, the tag advertising packet may include beacon location information that is located in the beacon advertising packets, which indicates the physical location of the beacon.

As described herein, the battery 55 may be operably coupled to the processing apparatus 52, and in turn, to the antenna 59 to provide the power, or electricity, to the processing apparatus 52 and antenna 59 to allow the processing apparatus 52 and antenna 59 to perform, or execute, the functionality described herein. The battery 55 may include a capacity between about 50 milliamp hours (mAh) to about 20,000 mAh. In one embodiment, the battery includes a capacity of 850 mAh.

Each of the beacons 10 may be similar to the asset tag device 50, and as such, it is to be understood that each of the beacons 10 may include the same or similar components as the asset tag device 50 but may be configured differently to provide the tracking functionality of the system 11. For example, each of the beacons 10 may include processing apparatus, an antenna, and a battery similar to the processing apparatus 52, an antenna 59, and a battery 55 of the asset tag device 50.

The antenna of the beacons 10 may be configured to transmit and receive radiofrequency (RF) signals to perform the functionality and processes described herein. In particular, the beacons 10, using their antennas, may be configured to transmit and receive advertising packets using a BLUETOOTH LOW ENERGY (BLE) operating at 2.4 GHz, which may be transmitted, or broadcast, up to approximately 500 meters. More specifically, each beacon 10 may be configured to transmit, or broadcast, beacon advertising packets. The beacon advertising packets may be transmitted periodically. For example, in at least one embodiment, a beacon advertising packet may be transmitted about every 10 milliseconds (ms) to about every 10 seconds. In other words, the beacon advertising packet broadcasting time period may be between about 10 ms to about 10 seconds. For example, in at least one embodiment, the time period between transmitting of beacon advertising packets, or the beacon advertising packet broadcasting time period, may be 1 second. Further, for example, In at least one embodiment, the time period between transmitting of beacon advertising packets, or the beacon advertising packet broadcasting time period, may be greater than or equal to 10 ms, greater than or equal to 50 ms, greater than or equal to 100 ms, greater than or equal to 200 ms, or greater than or equal to 500 ms, and/or less than or equal to 10 seconds, less than or equal to 5 seconds, less than or equal to 2 seconds, or less than or equal to 1 second. Additionally, it is to be understood that the beacon 10 may be programmed, or configured, at the time of manufacture and/or prior to use to utilize a selected beacon advertising broadcasting time period based on various factors such as, for example, a quantity of beacons 10 being utilized in a physical space, location resolution of asset tag device 50 desired, broadcast distance of the beacons, power requirements, and the dynamics of the physical space.

Each beacon advertising packet may include a beacon identifier that is a unique identifier that allows other devices and systems to identify the beacon 10 and correlate such identify to other information about the beacon 10 such as, for example, the physical location of the beacon 10. For example, one or more of the asset tag devices 50, the gateway 60, the server 70 may include a beacon location registry, database, or lookup table that correlates beacon identifiers with the physical location of such beacons 10. In one or more embodiments, each of the beacon advertising packets may include a payload portion, and the payload portion may include location information of the beacon. The location information of the beacon advertising packet may include one or more of latitude and longitude, GPS coordinates, Cartesian coordinates, room names, pillar number, distance from a reference point, and/or any other suitable beacon location information.

Each of the gateway 60 and the server 70 may be computing devices or apparatus operably coupled via the internet 99, as shown, or any other network. Generally, the gateway 60 may be described as an on-premises device meaning that the gateway 60 is located in the physical space where the beacons 10 and the asset tag device 50 are performing the tracking functionality described herein. Generally, the server 70 may not be located on-premises, and instead, may be located remotely from the physical space where the beacons 10, asset tag device 50, and the gateway 60 are located.

Each of the gateway 60 and the server 70 may include computing abilities similar to the processing apparatus 52 of the asset tag device 50 described herein except that while the processing apparatus 52 of the asset tag device 50 is configured for low power consumption, the gateway 60 and the server 70 can also be configured for lower power consumption or are may not be configured with such low power constraints. In some embodiments, the gateway 60 and the server 70 may be, for example, any fixed or mobile computer system, and the exact configuration of thereof is not limiting and essentially any device capable of providing suitable computing capabilities and control capabilities to facilitate the functionality and processes described herein may be used. Thus, in some embodiments, the gateway 60 or the server 70 may be battery powered units and manage their power accordingly in order to match batter life to the intended application of the gateway 60 or the server 70. In at least one embodiment, the gateway 60 is a battery powered, mobile cellular devices. Additionally, the gateway 60 may also perform the same functionality as described herein with respect to the tag asset device 50, and thus, may also be attached, or coupled, to an asset to provide tracking thereof. Further, the gateway 60 further includes an antenna, which may be similar to antenna 59 of the asset tag device 50, to receive advertising packets from the one or both of the asset tag device 50 and the beacons 10.

As shown, diagrammatically shown using nested semi-circles in FIG. 1, each of the beacons 10 may wirelessly transmit, or broadcast, beacon advertising packets, which may be received by the asset tag device 50. The asset tag device 50 may wirelessly transmit, or broadcast, tag advertising packets, which may be received the gateway 60. The gateway 60 may transmit the received tag advertising packets and/or data included or derived therein to the server 70 via the internet 99 or another network.

Using the illustrative system 11 described herein, a user may place beacons 10 in known locations and asset tag devices 50 on assets to be tracked. The asset tag devices 50 may periodically scan for beacons 10, and then rebroadcast beacon information (e.g., beacons location information and/or beacon advertising packets) in tag advertising packets. In such embodiments, the asset tag device 50 may be described as performing a dual role as a scanner and a broadcaster to enable solutions to determine or identify the beacon 10 that the asset tag device 50 is closest to, and in turn, determine a location (e.g., an approximate location) of the asset tag device 50. The gateway 60 may store and forward asset device tag information and beacon information from the tag advertising packets to a server 70 in the cloud.

Figure 2:
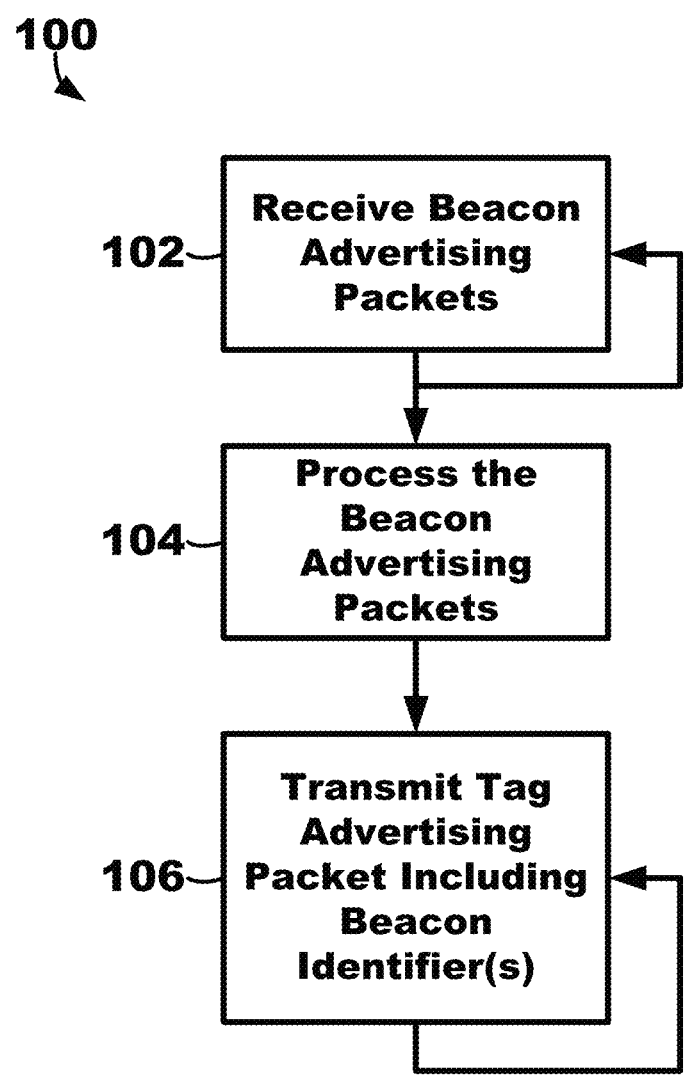
FIG. 2 is flow diagram of an illustrative method performed by an asset tag device of the illustrative system of FIG. 1.

An illustrative method 100 performed by an asset tag device 50 of the illustrative system 11 is depicted in FIG. 2. Generally, the asset tag device 50 may receive beacon advertising packets 102, process beacon advertising packets 104, and transmit beacon advertising packets 106. Although the processes 102, 104, 106 are depicted consecutively (top of the page to bottom of the page), it is to be understood that processes 102, 104, 106 may be running simultaneously. Additionally, it is to be understood that process 102, 106 may also be running periodically as indicated by the arrow circling back from each respective process 102, 106.

Receiving beacon advertising packets 102 may include periodically scanning for beacon advertising packets 102. If a beacon advertising packet is identified during scanning, it may be captured and processed 104 by the asset tag device 50. In one embodiment, the processing 104 of the received beacon advertising packets may mean that the received beacon advertising packets or information thereof is merely repackaged, or placed within, the payload portion of a tag advertising packet that is subsequently transmitted 106. More specifically, the beacon identifier contained within the received beacon advertising packet may be clipped or stripped from the received beacon advertising packet and then placed in the payload portion of the tag advertising packet.

Further, in one or more embodiments, additional data may be processed from and/or based on the received beacon advertising packets. For example, a signal strength value may be determined for each of the received beacon advertising packets corresponding to and representative of a signal strength of the received beacon advertising packet. The signal strength value corresponding to a beacon identifier, or the beacon identifier of the beacon 10 associated with the signal strength value, may then be included in the payload portion of the tag advertising packet, which may be used by the gateway 60 and/or server 70 to determine the closest beacon 10 to the asset tag device 50.

Further, for example, a number of observations for each of the received beacon advertising packets that each received beacon advertising packet has been observed over an observation period may be determined. The observation period may be measured or determined in various ways. For instance, the observation period may be time-based, may be determined by the application and may be any appropriate time period for the application. In some embodiments, the observation period may be between about 10 seconds and about 30 minutes. In at least one embodiment, the observation period is 5 minutes. In at least one embodiment, the observation period may greater than or equal to 10 seconds, greater than or equal to 15 seconds, greater than or equal to 30 seconds, greater than or equal to 1 minute, or greater than or equal to 3 minutes and/or less than or equal to 30 minutes, less than or equal to 20 minutes, less than or equal to 10 minutes, or less than or equal to 8 minutes. Further, for instance, the observation period may be a number of scans performed by the asset tag device 50 and may be any number of scans that is appropriate for the particular application. The number of scans may be between about 1 scan and 100 scans. In at least one embodiment, the number of scans defining an observation period is 3 scans. In at least one embodiment, the number of scans defining an observation period is greater than or equal to 2 scans, greater than or equal to 5 scans, greater than or equal to 10 scans, or greater than or equal to 25 scans and/or less than or equal to 90 scans, less than or equal to 75 scans, or less than or equal to 50 scans. Thus, the number of observations for each of the received beacon advertising packets that each received beacon advertising packet has been observed over an observation period may then be included in the payload portion of the tag advertising packet, which may be used by the gateway 60 and/or server 70 to determine the closest beacon 10 to the asset tag device 50.

In another embodiment, the processing 104 of the received beacon advertising packets may mean that the beacon advertising packets or information thereof is utilized by the asset tag device 50 to determine the closest beacon 10 to the asset tag device 50. Upon determining the closest beacon 10, the asset tag device 50 may include only the beacon identifier of the closest beacon 10 in the payload portion of the tag advertising packet.

Additionally, as described herein, the beacon advertising packets may include location information for the beacon 10 (such as, for example, in the payload portion of the beacon advertising packets), and the asset tag device 50 may process the location information provided by the beacon advertising packets. The location information of each beacon advertising packet may be repackaged or included in the tag advertising packets for use by one or both of the gateway 60 and server 70. Further, the location information of each beacon advertising packet may be used by the asset tag device 50 to determine the approximate location of the asset tag device 50, and the approximate location of the asset tag device 50 may be included in the tag advertising packets for use by one or both of the gateway 60 and server 70.

Thus, it may be described that the asset tag device 50 may process the beacon advertising packets minimally and more substantively. In the minimal configuration, the beacon advertising packets or information thereof are basically "passed on" or re-broadcast using the tag advertising packets. In the more substantive configurations, the beacon advertising packets or information thereof may be processed to determine additional information related thereto such as the closest beacon (e.g., based on signal strength and/or number of observations) and/or location information provided in the beacon advertising packets.

As described herein, the asset tag device 50 may receive beacon advertising packets 102 periodically. The time period between scans for beacon advertising packets may be any time that is reasonably appropriate for the particular application and may be between about 5 seconds and 60 minutes. In at least one embodiment, the time period between scans for beacon advertising packets is 1 minute. In at least one embodiment, the time period between scans for beacon advertising packets may be greater than or equal to 10 seconds, greater than or equal to 15 seconds, greater than or equal to 30 seconds, greater than or equal to 45 seconds, greater than or equal to 1 minute, greater than or equal to 2 minutes, greater than or equal to 5 minutes, or greater than or equal to 10 minutes and/or less than or equal to 60 minutes, less than or equal to 45 minutes, less than or equal to 30 minutes, less than or equal to 20 minutes, or less than or equal to 15 minutes.

Further, the asset tag device 50 may transmit or broadcast tag advertising packets 106 periodically. The time period between transmission of tag advertising packets may be any time that is reasonably appropriate for the particular application and may be between about 1 second and 10 minutes. In at least one embodiment, the time period between transmission of tag advertising packets is 10 seconds. In at least one embodiment, the time period between scans for tag advertising packets may be greater than or equal to 1 seconds, greater than or equal to 2 seconds, greater than or equal to 5 seconds, greater than or equal to 15 seconds, greater than or equal to 30 seconds, or greater than or equal to 1 minute, and/or less than or equal to 10 minutes, less than or equal to 5 minutes, less than or equal to 3 minutes, or less than or equal to 2 minutes.

Figure 3:
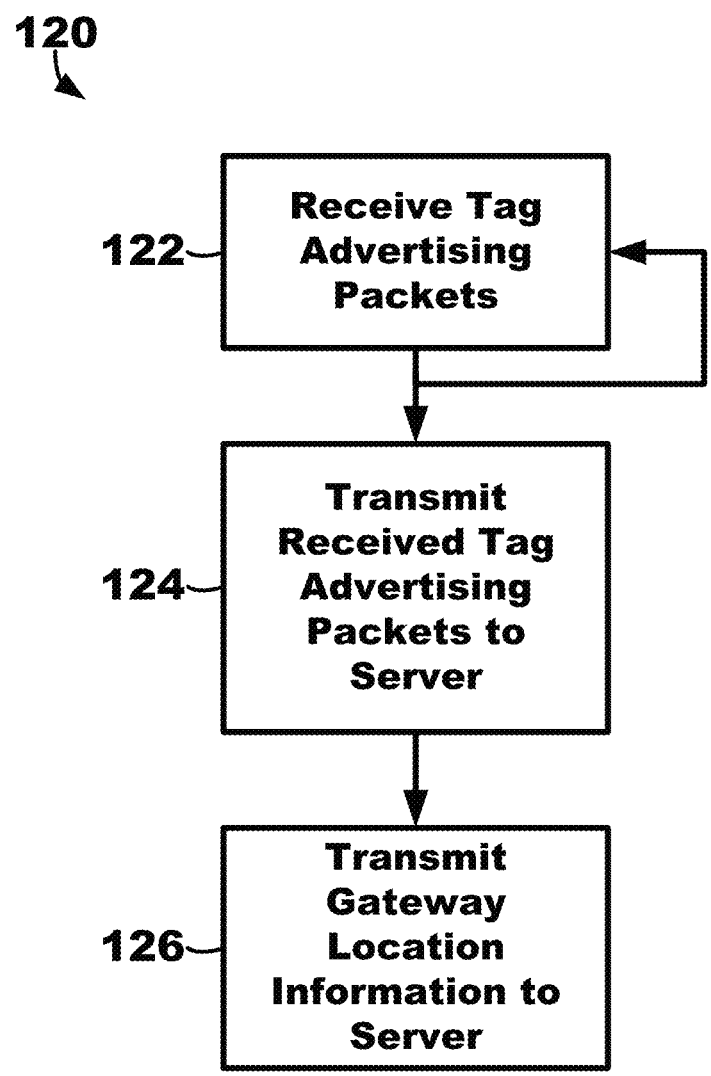
FIG. 3 is flow diagram of an illustrative method performed by a gateway of the illustrative system of FIG. 1.

An illustrative method 120 performed by a gateway 60 of the illustrative system 11 is depicted in FIG. 3. The gateway 60 may receive tag advertising packets 122 transmitted, or broadcast, from one or more asset tag devices 50. Further, in some embodiments where the gateway 60 includes functionality similar to the asset tag device 50, the gateway 60 may receive beacon advertising packets from any nearby beacons 10. The process 122 may include periodically scanning for tag advertising packets, and if a tag advertising packet is identified during scanning, it may be captured and then transmitted 124 to the server 70 via a network such as the internet 99. Additionally, the gateway 60 may transmit gateway location information 126 to the server. The gateway location information may include one or more of latitude and longitude, GPS coordinates, Cartesian coordinates, room names, pillar number, distance from a reference point, and/or any other suitable location or spatial information to identify the location of the gateway.

Figure 4:
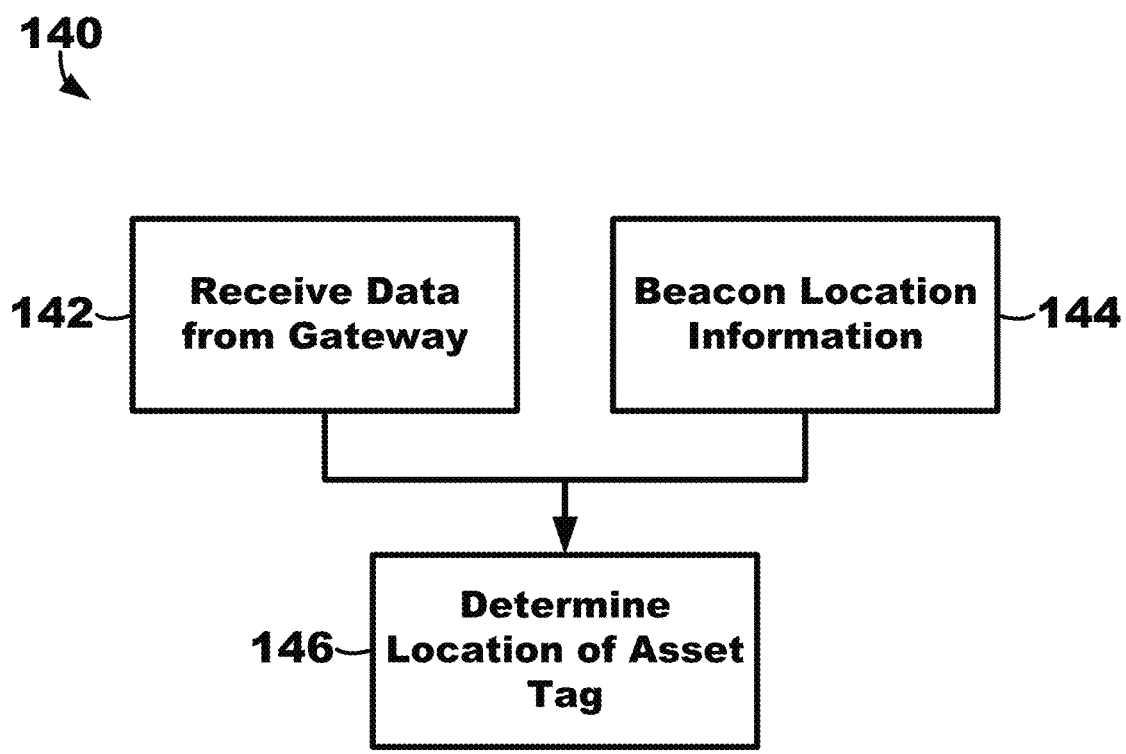
FIG. 4 is flow diagram of an illustrative method performed by a server of the illustrative system of FIG. 1.

An illustrative method 140 performed by a server 70 of the illustrative system 11 is depicted in FIG. 4. The server 70 may receive data from the gateway 142 such as tag advertising packets and/or data related thereto or extracted therefrom. As described, the server 70 may include beacon location information 144 such as, for example, one or more of latitude and longitude, GPS coordinates, Cartesian coordinates, room names, pillar number, distance from a reference point, and/or any other suitable location or spatial information to identify the location of the beacons 10.

The server 70 may use the beacon location information 144 and the received data from the gateway 142 to determine the location of the asset tag device 146. Determination of the location of the asset tag device 146 may be performed or executed in various ways. For example, the server 70 may include a beacon location registry, database, or lookup table, and the server 70 may determine the closest beacon 10 to the asset tag device 50 based on, for example, the beacon identifiers in data from the gateway, signal strength values in the data from the gateway, number of observations of beacons in the data from the gateway, and/or any other data related to the beacons, and then correlate the closest beacon 10 in the beacon location registry, database, or lookup table to determine the approximate location of the asset tag device 50. Further, for example, the approximate location for the asset tag device 50 may have already been processed or computed by one or both of the asset tag device 50 itself or the gateway 60, and in such circumstances, the location of the asset tag device 50 may be determined by the server 70 by merely being received.

Figure 5:
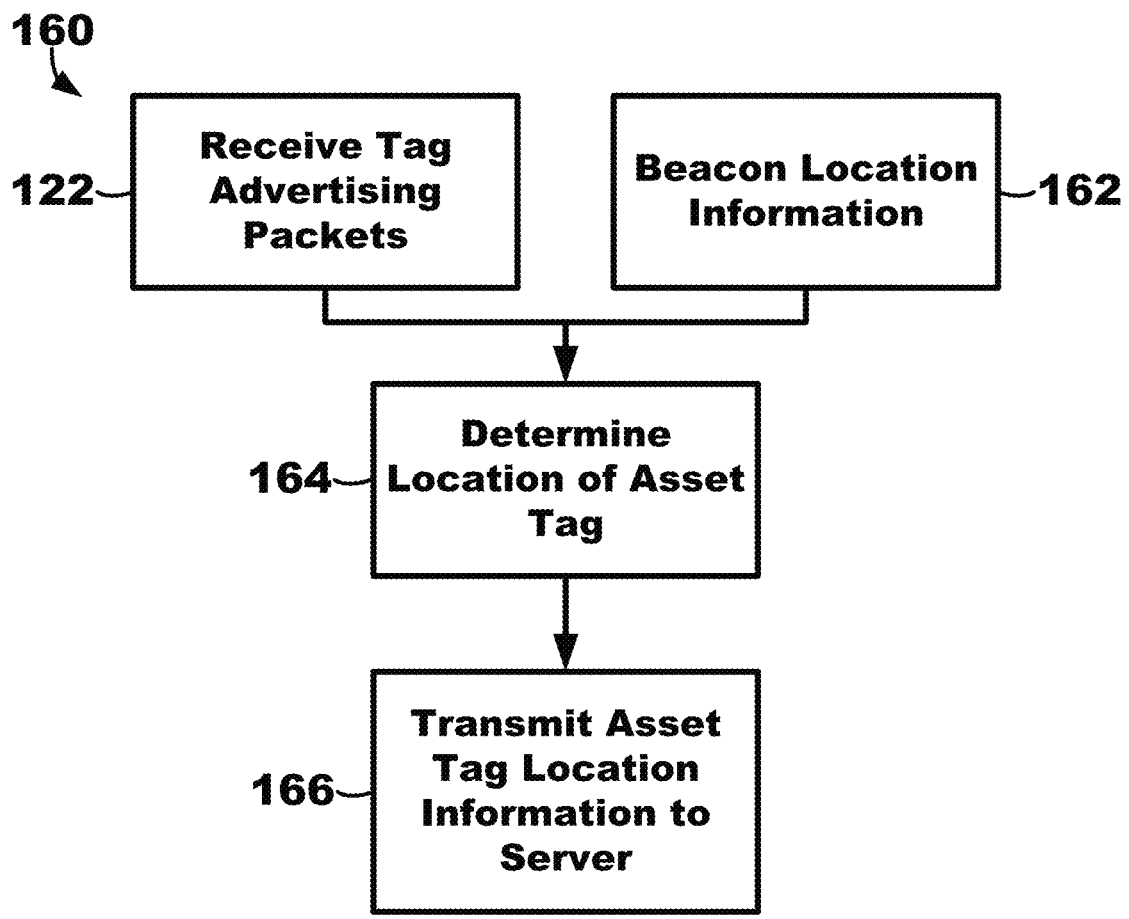
FIG. 5 is flow diagram of another illustrative method performed by a gateway of the illustrative system of FIG. 1.

Another illustrative method 160 performed by a gateway 60 of the illustrative system 11 is depicted in FIG. 5. In this example, receiving tag advertising packets 122 may be the same or similar as process 122 of method 120 of FIG. 3. In this example, however, the gateway 60 may perform various processing on the received tag advertising packets. For example, the gateway 60 may analyze the received tag advertising packets to determine the location of the asset tag device 164. For instance, the gateway 60 may process the received tag advertising packets to determine the closest beacon 10 to the asset tag device 50, and then consult beacon location information 162 so as to determine an approximate location of the asset tag device 50. For instance, the gateway 60 may include a beacon location registry, database, or lookup table that correlates beacon identifiers with the physical location of such beacons 10. The gateway 60 may utilize the beacon location registry and the beacon identifiers received in the payload of the tag advertising packets to determine the approximate location of the asset tag device 50. Additionally, as described herein, the tag advertising packets may include signal strength in addition to, or in some embodiments instead of, a number of observations for each unique beacon, and the gateway 60 may analyze such signal strength and/or number of observation data to determine which of the beacons 10 is closest to the asset tag device 50. Then, the asset tag location or information related thereto may be transmitted 166 to the server 70 via a network such as the internet 99.

Thus, it may be described that the gateway 60 may process the tag advertising packets minimally as described by method 120 of FIG. 3 and more substantively as described by method 160 of FIG. 5. In the minimal configuration, the tag advertising packets or information thereof are basically "passed on" or re-transmitted to the server 70. In the more substantive configurations, the tag advertising packets or information thereof may be processed to determine additional information related thereto such as the closest beacon (e.g., based on signal strength and/or number of observations) and/or approximate location of the asset tag device 50.

Figure 6A:
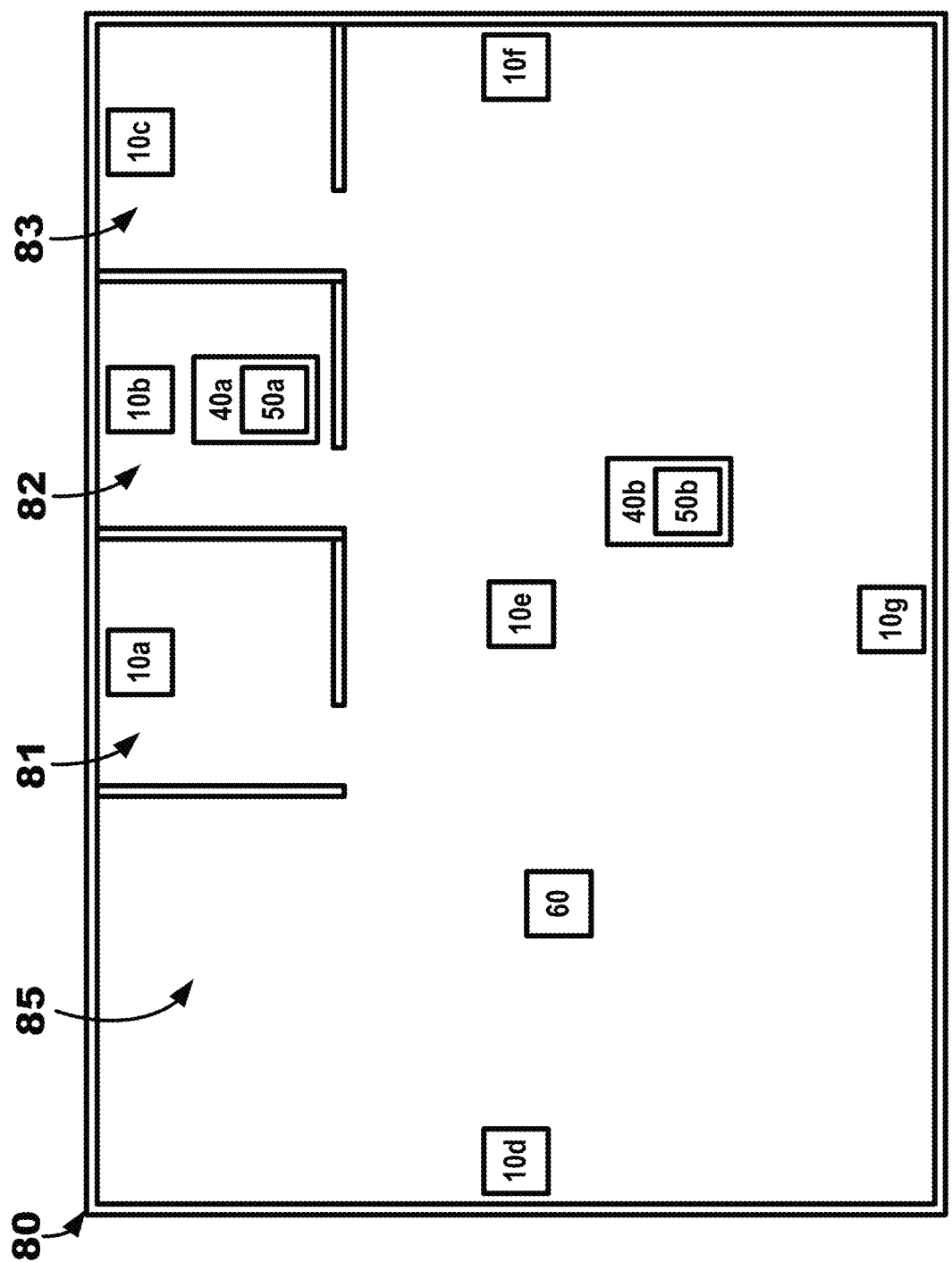

Diagrammatic overhead views of an illustrative system 11 performing asset tracking according to the methods and processes described herein are depicted in FIGS. 6A-6D. As shown in FIG. 6A, the overhead views are of a physical space 80 depicted in two-dimensions. As shown, the physical space 80 includes, or defines, a large open area 85, a first small room 81, a second small room 82, and a third small room 83, and a plurality of beacons 10a, 10b, 10c, 10d, 10e, 10f, 10g are distributed about the physical space 80. A first object 40a having a first asset tag device 50a is located in the second small room 82, and a second object 40b having a second asset tag device 50b is located in the large open area 85, and gateway 60 is located in the large open area 85.

Each of the beacons 10 may transmit, or broadcast, beacon advertising packets as depicted as concentric circles emanating from each of the beacons 10 in FIG. 6B. The beacon advertising packets may be received by the asset tag devices 50 and the asset tag devices 50 may record the signal strength of each beacon advertising packet in addition to, or in some embodiments instead of, a number of observations over an observation period.

Figure 6C:
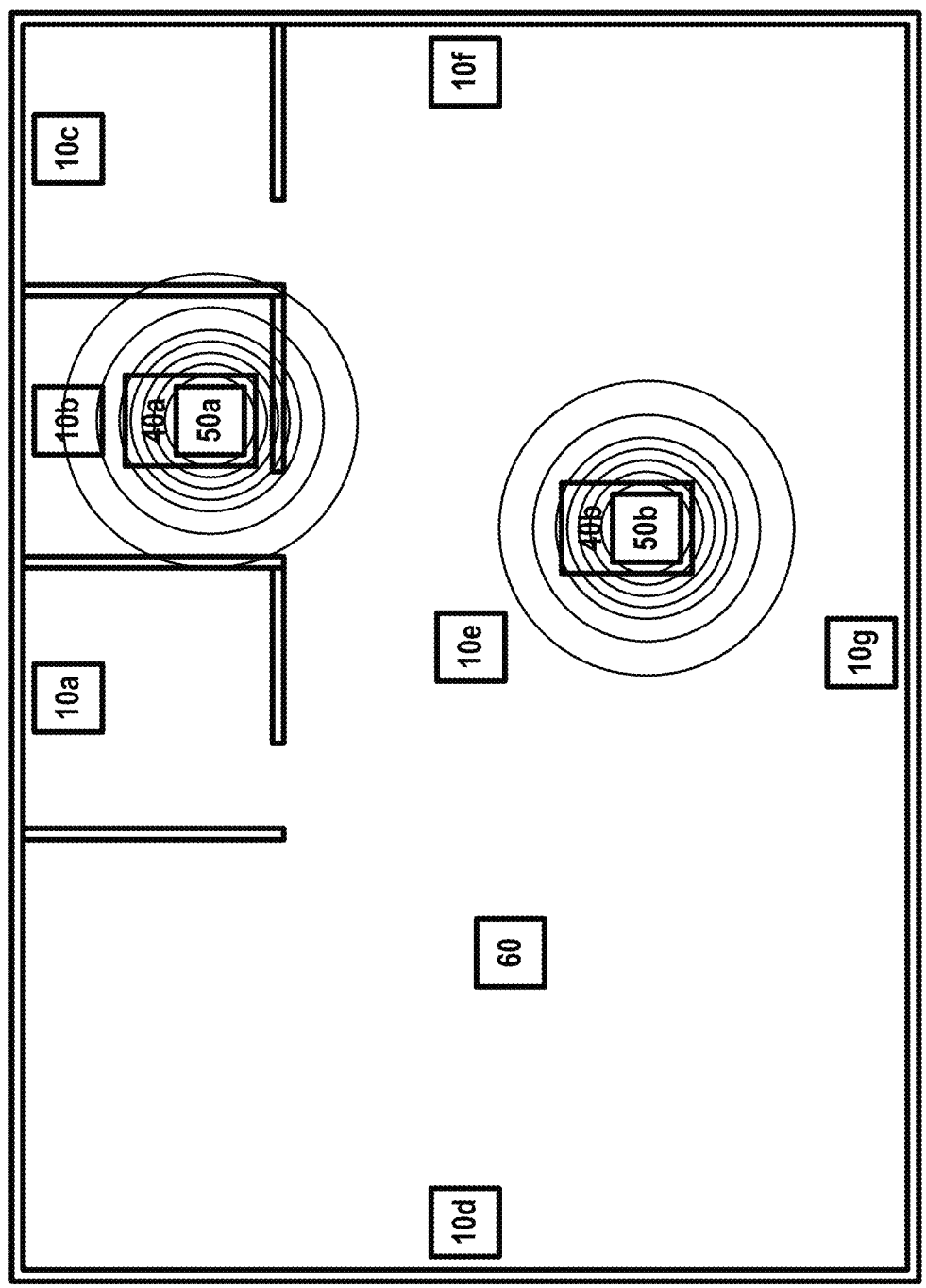

Each of the asset tag devices 50 may transmit, or broadcast, tag advertising packets as depicted as concentric circles emanating from each of the asset tag devices 50 in FIG. 6C. As described herein, in one or more embodiments, the tag advertising packet of the asset tag device 50a may include, at least, beacon information of beacon 10b such as, for example, one or more of a beacon identifier, signal strength, and number of observations, thereby indicating that beacon 10b is the closest beacon 10 to the asset tag device 50a. Further, in one or more embodiments, the tag advertising packet of the asset tag device 50B may include, at least, beacon information of beacon 10e such as, for example, one or more of a beacon identifier, signal strength, and number of observations, thereby indicating that beacon 10e is the closest beacon to the asset tag device 50b.

Figure 6D:
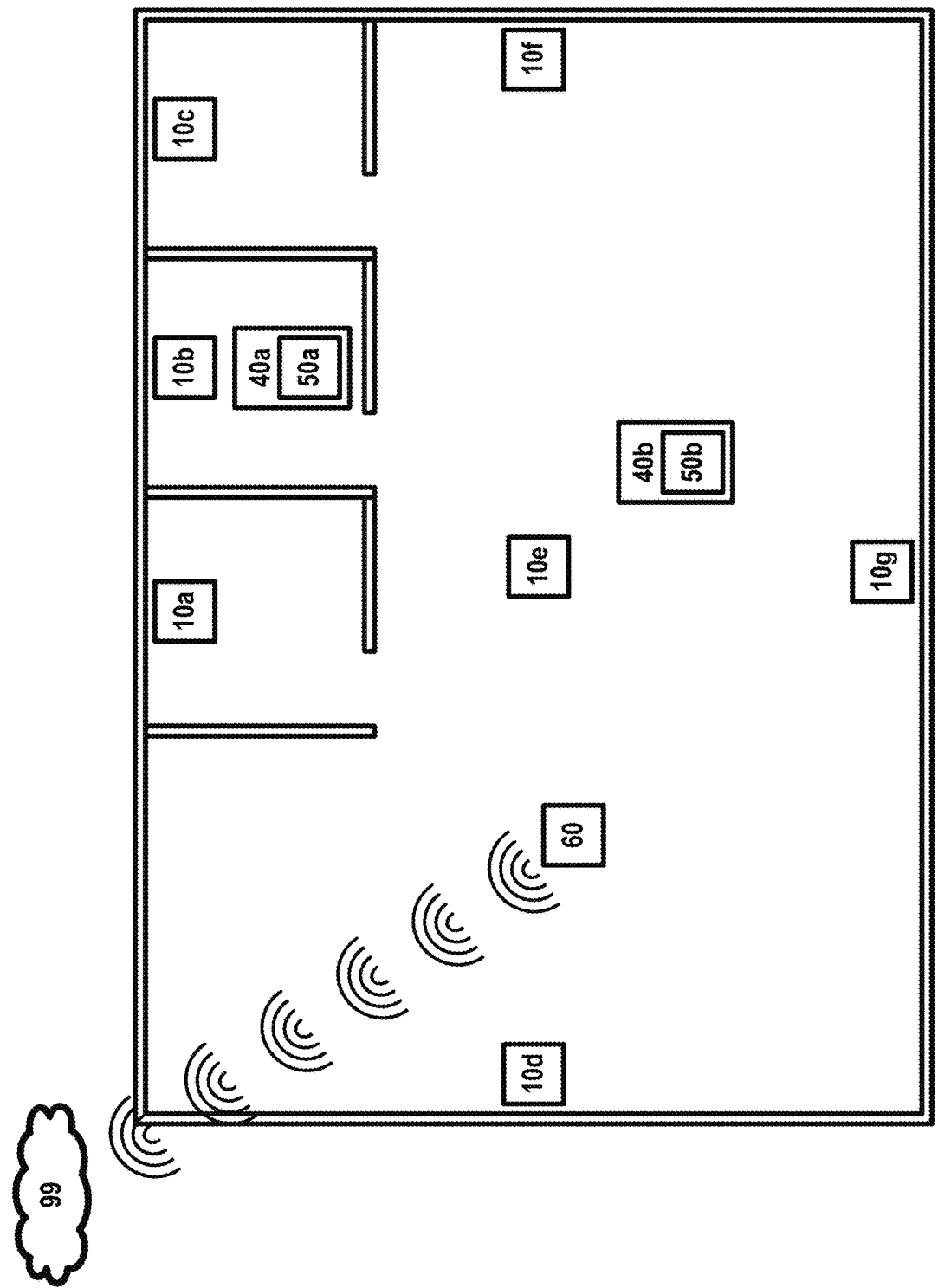

The tag advertising packets may be received by the gateway 60, and then tag advertising packets or data derived or extrapolated therefrom may be transmitted to the server 70 via a network such as the internet 99 as depicted in FIG. 6D. Although nested semicircles are shown emanating away from the gateway 60 to the internet 99, it is to be understood that the gateway 60 may be connected to the server 70 using any way known in the art via wireless or wired data connection or any wide area or local network.

Below there is provided a non-exhaustive listing of non-limiting examples.

Any one or more of the features of these examples may be combined with any one or more features of another example, embodiment, or aspect described herein.

Example Ex1: A system comprising:
a plurality of beacons positioned about a physical space, each beacon comprising an antenna to transmit beacon advertising packets, each beacon advertising packet comprising a beacon identifier;
an asset tag device attached to an asset and comprising an antenna to receive beacon advertising packets and to transmit tag advertising packets, each tag advertising packet comprising a tag identifier and one or more beacon identifiers of the received beacon advertising packets; and
a gateway comprising an antenna to receive tag advertising packets.

Example Ex 2: An asset tag device comprising:
an antenna to receive beacon advertising packets and to transmit tag advertising packets; and
a processing apparatus comprising one or more processors and operably coupled to the antenna and configured to:
receive beacon advertising packets from a plurality of beacons positioned about a physical space, each beacon advertising packet comprising a beacon identifier; and
transmit tag advertising packets, each tag advertising packet comprising a tag identifier and one or more beacon identifiers of the received beacon advertising packets.

Example Ex 3: A method comprising:
receiving beacon advertising packets from a plurality of beacons positioned about a physical space, each beacon advertising packet comprising a beacon identifier; and
transmitting tag advertising packets, each tag advertising packet comprising a tag identifier and one or more beacon identifiers of the received beacon advertising packets.

Example Ex 4: The system as in example Ex1, the device as in example Ex2, or the method as in example Ex3, wherein the beacon advertising packets and the tag advertising packet are BLUETOOTH LOW ENERGY advertising packets.

Example Ex 5: The systems, devices, or methods as in any one of examples Ex1-4, wherein the one or more beacon identifiers of the tag advertising packet is stored in a payload portion of the tag advertising packet.

Example Ex 6: The systems, devices, or methods as in any one of examples Ex1-5, wherein the one or more beacon identifiers of the tag advertising packet comprises at least the beacon identifier of the received beacon advertising packets from the beacon of the plurality of beacons closest to the asset tag device.

Example Ex 7: The systems, devices, or methods as in any one of examples Ex1-5, wherein the one or more beacon identifiers of the tag advertising packet comprises the beacon identifier of the received beacon advertising packets having the strongest signal of the received beacon advertising packets.

Example Ex 8: The systems, devices, or methods as in any one of examples Ex1-5, wherein the one or more beacon identifiers of the tag advertising packet comprises the beacon identifier of at least two of the received beacon advertising packets.

Example Ex 9: The systems, devices, or methods as in any one of examples Ex1-8, wherein the tag advertising packet further comprises a signal strength value for each of the received beacon advertising packets corresponding to and representative of a signal strength of the received beacon advertising packet.

Example Ex 10: The systems, devices, or methods as in any one of examples Ex1-9, wherein the tag advertising packet further comprises a number of observations for each of the received beacon advertising packets that each received beacon advertising packet has been observed over an observation period.

Example Ex 11: The systems, devices, or methods as in example Ex10, wherein the observation period is a number of scans performed by the asset tag device.

Example Ex 12: The systems, devices, or methods as in example Ex10, wherein the observation period is time period.

Example Ex 13: The systems as in any one of examples Ex1-12, wherein the system further comprises a server operably coupled to the gateway, wherein the gateway is further configured to transmit the received tag advertising packets to the server, wherein the server comprises beacon location information for each of the plurality of beacons, wherein the beacon location information identifies where each beacon is located in the physical space, wherein the server is configured to determine the location of the asset tag device based on the received tag advertising packets and the beacon location information.

Example Ex 14: The systems as in example Ex13, wherein the gateway comprises gateway location information identifying where the gateway is located in the physical space, wherein the gateway is further configured to transmit the gateway location information to the server.

Example Ex 15: The systems as in any one of examples Ex1-12, wherein the gateway comprises beacon location information for each of the plurality of beacons, wherein the beacon location information identifies where each beacon is located in the physical space, wherein the gateway is configured to determine the location of the asset tag device based on the received tag advertising packets and the beacon location information.

Example Ex 16: The systems, devices, or methods as in any one of examples Ex1-12, wherein each beacon advertising packet further comprises beacon location information identifying where the corresponding beacon is located in the physical space.

Example Ex 17: The systems, devices, or methods as in example Ex16, wherein the tag advertising packet further comprises the beacon location information for each of the received beacon advertising packets.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. A system comprising:
   a plurality of beacons positioned about a physical space, each beacon comprising an antenna to transmit beacon advertising packets, each beacon advertising packet comprising a beacon identifier;
   an asset tag device attached to an asset and comprising an antenna to receive beacon advertising packets and to transmit tag advertising packets, each tag advertising packet comprising:
     a tag identifier;
     one or more beacon identifiers of the received beacon advertising packets; and
     a number of observations for each of the received beacon advertising packets that each received beacon advertising packet has been observed over an observation period; and
   a gateway comprising an antenna to receive tag advertising packets.

2. The system of claim 1, wherein the beacon advertising packets and the tag advertising packet are BLUETOOTH LOW ENERGY advertising packets.

3. The system of claim 1, wherein the one or more beacon identifiers of the tag advertising packet is stored in a payload portion of the tag advertising packet.

4. The system of claim 1, wherein the one or more beacon identifiers of the tag advertising packet comprises at least the beacon identifier of the received beacon advertising packets from the beacon of the plurality of beacons closest to the asset tag device.

5. The system of claim 1, wherein the one or more beacon identifiers of the tag advertising packet comprises the beacon identifier of the received beacon advertising packets having the strongest signal of the received beacon advertising packets.

6. The system of claim 1, wherein the one or more beacon identifiers of the tag advertising packet comprises the beacon identifier of at least two of the received beacon advertising packets.

7. The system of claim 1, wherein the tag advertising packet further comprises a signal strength value for each of the received beacon advertising packets corresponding to and representative of a signal strength of the received beacon advertising packet.

8. The system of claim 1, wherein the observation period is a number of scans performed by the asset tag device.

9. The system of claim 1, wherein the observation period is a time period.

10. The system of claim 1, wherein the gateway comprises beacon location information for each of the plurality of beacons, wherein the beacon location information identifies where each beacon is located in the physical space, wherein the gateway is configured to determine the location of the asset tag device based on the received tag advertising packets and the beacon location information.

11. The system of claim 1, wherein the system further comprises a server operably coupled to the gateway, wherein the gateway is further configured to transmit the received tag advertising packets to the server, wherein the server comprises beacon location information for each of the plurality of beacons, wherein the beacon location information identifies where each beacon is located in the physical space, wherein the server is configured to determine the location of the asset tag device based on the received tag advertising packets and the beacon location information.

12. The system of claim 11, wherein the gateway comprises gateway location information identifying where the gateway is located in the physical space, wherein the gateway is further configured to transmit the gateway location information to the server.

13. The system of claim 1, wherein each beacon advertising packet further comprises beacon location information identifying where the corresponding beacon is located in the physical space.

14. The system of claim 13, wherein the tag advertising packet further comprises the beacon location information for each of the received beacon advertising packets.

* * * * *